United States Patent [19]

Wilson et al.

[11] Patent Number: 4,702,956
[45] Date of Patent: Oct. 27, 1987

[54] METHOD OF BONDING GLASS FIBERS OR OTHER SUBSTRATES TO VARIOUS POLYMERS BY OXIDIZING THE MOLTEN POLYMER SURFACE, AND ARTICLES PRODUCED THEREBY

[75] Inventors: George S. Wilson, Ringwood; Harvey E. Kline, Succasunna; Joseph E. Mackey, East Hanover, all of N.J.

[73] Assignee: Ausimont, U.S.A., Inc., Morristown, N.J.

[21] Appl. No.: 808,201

[22] Filed: Dec. 12, 1985

[51] Int. Cl.⁴ .............................................. B32B 7/00
[52] U.S. Cl. ...................................... 428/251; 156/82; 156/244.11; 156/244.23; 428/246; 428/268; 428/421; 428/422
[58] Field of Search ............... 156/82, 244.11, 244.23; 428/251, 252, 273, 284, 285, 421, 422, 268, 296, 246

[56] References Cited

U.S. PATENT DOCUMENTS

| | | | |
|---|---|---|---|
| 2,700,631 | 1/1955 | Ferguson et al. | 156/82 |
| 3,640,788 | 2/1972 | Flynn | 156/82 |
| 3,829,343 | 8/1974 | Remmert | 156/82 |
| 4,003,777 | 1/1977 | Eddy | 156/82 |
| 4,311,745 | 1/1982 | Craver | 156/82 |
| 4,381,330 | 4/1983 | Gotomyo et al. | 428/296 |

FOREIGN PATENT DOCUMENTS 725127  1/1966  Canada .................................. 156/82

Primary Examiner—James J. Bell
Attorney, Agent, or Firm—John G. Gilfillan, III; Elliot M. Olstein; Raymond J. Lillie

[57] ABSTRACT

The surface of a molten polymer is treated with a flame as the polymer is extruded; the polymer is co-calendered with a substrate as a fibrous web immediately downstream from the extruder and the flame. Articles so treated exhibit superior bond strengths. In one embodiment, both the polymer and the web are treated with a flame prior to the step of co-calendering.

13 Claims, 1 Drawing Figure

METHOD OF BONDING GLASS FIBERS OR OTHER SUBSTRATES TO VARIOUS POLYMERS BY OXIDIZING THE MOLTEN POLYMER SURFACE, AND ARTICLES PRODUCED THEREBY

BACKGROUND OF THE INVENTION

1. Field of the Invention.

The present invention is in the field of methods of bonding a polymeric material to a web. More particularly, this invention is in the field of bonding a polymer to fibrous substrate.

2. Description of the Prior Art.

Composite materials formed by the adhesion of a polymer to a web, such as, e.g., fabric webs, are well-known in the art. Examples of such composites include raincoats, rubber on cotton; tires, rubber on glass or steel; and wet-strength paper, urea-formaldehyde on cellulose.

Methods of applying the polymer to the web include dipping the web into a solution or suspension of the polymer, and calendering the web with the polymer. When a polymer and the web are co-calendered, it is desireable to have a composite in which the adjacent layers adhere to other layers. This can be measured as peel strength in grams (g) per centimeter (cm) necessary to separate adjacent layers of a 2.54-cm-wide strip.

Attempts to produce composites with improved peel strengths have included, e.g., increased pressure and temperature of the calender rolls, and pre-heat-treating the fabric web by infra-red or other heat application. Such treatments have resulted only in incremental improvements in peel strength.

SUMMARY OF THE INVENTION

The present invention is the method of making a composite material comprising the steps of extruding a polymer, and treating the surface of the extruded molten polymer with a flame; the flame-treated molten polymer is then co-calendered with a web. In another embodiment of the invention, the web is also treated with a flame before the application of the polymer. The flame used is preferaby an oxidizing flame, and the web is preferably formed of glass cloth, more preferably of woven glass cloth.

DESCRIPTION OF THE PREFERRED EMBODIMENTS

Figure 1:
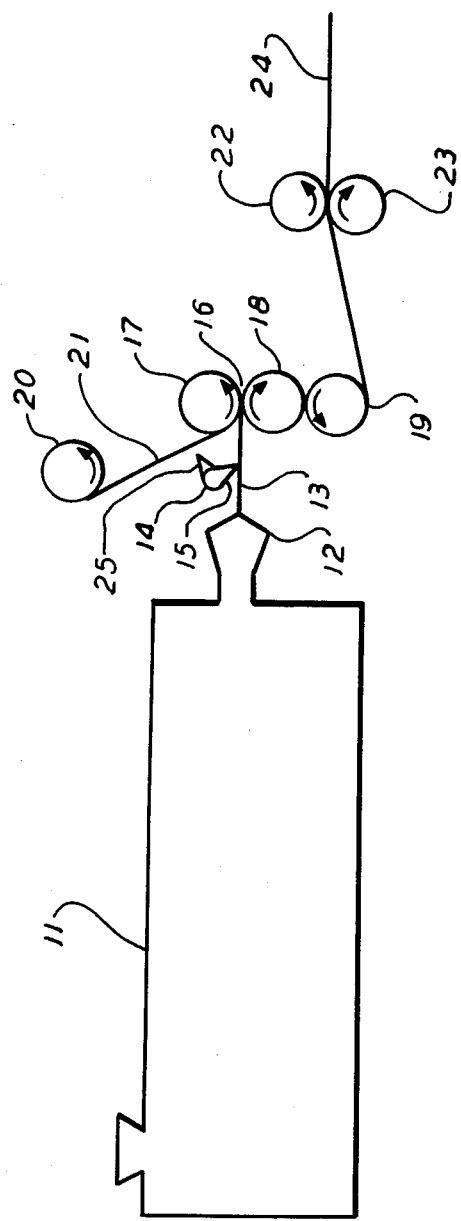
FIG. 1 is a schematic representation of the method of the present invention.

The preferred embodiment of the present invention is the method of making a composite material comprising the steps of extruding at least one polymer in the molten state, treating the surface of the extruded polymer with a flame, and co-calendering the flame-treated polymer with at least one web. More preferred is the method of producing a composite material by flame-treating the molten surface of the extruded polymer with an oxidizing flame. The most preferred method of the present invention is the method of making a composite material comprising the steps of extruding at least one polymer, treating the surface of the extruded polymer with an oxidizing flame, and co-calendering the flame-treated polymer with a web which has been treated with an oxidizing flame immediately prior to the step of co-calendering.

As used in this specification, the term "composite material" refers to at least one polymeric material adjacent to a web, generally of fibrous composition. It is within the scope and spirit of this specification to provide a composite with a polymer adhered to both sides of a web, generally by the process of calendering the materials together, and multi-layered materials comprising a plurality of flame-treated web and polymer layers.

Preferred materials for the web include, e.g., glass, graphite, boron, cotton, wool, nylon, poly(ethylene terephthalate) and other non-metallic fibers, and woven metallic fibers such as, e.g., aluminum, stainless steel, copper and silver. The web can be in the form of a fiber mat, produced as a woven or non-woven article. Typically, the glass fiber used for reinforcement is at least about 0.125 millimeter (mm) in average length in the final product. Glass fibers as normally used for reinforcement of thermoplastics may be treated or coated with a sizing composition. Standard sizing agents usually consist of several components, each of which possesses a distinct function, e.g., binders, lubricants, coupling agents and the like. Formulations of this kind, and methods of use, are known to those skilled in the art.

The fiber used in making the woven mat is preferably in the form of strands or bundles which are at least about 25 mm to continuous in length. The reinforcing mat may be woven or nonwoven; the strands or fiber comprising the reinforcing mat, if nonwoven, are held together either by resinous adhesive binders (thermosetting or thermoplastic resins) or by needling, or if woven, by the mechanical interaction of the randomly patterned weblike structure.

The individual strands in the mat comprise from about two to about 400, and preferably from about five to about 120, filaments per strand. Each filament is about 0.0075 to about 0.025 mm, preferably 0.0085 to 0.020 mm, in diameter. The mat comprising the reinforcing phase may have a weight of from about 10 to about 600 g per square meter (m).

Polymers useful in the method of the present invention include, e.g., polyamides which are long-chain polymeric amides having recurring amide groups as part of their polymer backbone; poly(vinyl chloride); poly(ethylene); poly(acrylonitrile); poly(cyanoacrylates); and poly(ethylene terephthalate). Preferred polymeric materials are halogen-containing polymers such as, e.g., ethylene chlorotrifluoroethylene(ECTFE) copolymer; ethylene tetrafluoroethylene copolymer; poly(vinylidene fluoride); copolyhexafluoro - isopropylene - tetrafluoroethylene; vinylidene fluoride - tetrafluororethylene copolymer; and poly(chlorotrifluororethylene). Most preferred is ECTFE copolymer sold under the trademark Halar ® by Allied Corporation and described in *Halar ® Fluoropolymer Resin, Technical Data Bulletin* and *Chemical Resistant Halar ® Fluoropolymer,* hereby incorporated by reference.

The incorporation into the composite of an adhesive material such as, e.g., polymeric nitriles and cyanoacrylates permits the preparation of commercially useful articles where good bonding to the web is desirable without the necessity of co-calendering the articles. Such article could include wall hangings and carpet; in the case of carpet, a web such as rubber, jute or poly(propylene) could have a flame-treated adhesive-type polymer co-calendered with it, and the carpet material later affixed by any appropriate economic means.

The method of the present invention is described by reference to FIG. 1. The arrrangement illustrated in FIG. 1 is useful to accomplish the method of the present invention, which should not, however, be limited thereto. Extruder 11 is equipped with die 12, from which molten polymer 13 is extruded. At or very close to the point where polymer 13 emerges from die 12, a flame-producing means such as torch 14 directs flame 15 onto the molten surface of polymer 13, just prior to its entering the nip 16 defined by the closest distance between adjacent rolls 17 and 18. Web 21 is fed to nip 16 from web roll 20, and is co-calendered with the molten polymer at nip 16; the composite material 24 is carried on rolls 18 and preferably 19, which can both be temperature-controlled, and can be transferred to take-up rolls 22 and 23 for tension control, from which point it is rolled, cut or otherwise packaged by means well known to those skilled in the art, which means form no part of this invention as such.

In another embodiment of this invention, torch 14 or a separate flame-producing means is utilized to direct flame 25 onto web 21 immediately upstream from nip 16. By the operation of flame-treating web 21 just prior to its entering nip 16, any sizing, lubricant or other material which might interfere with a good bond is removed from the web.

It has been determined that an oxidizing flame provides the best bond between web 21 and polymer 13 in the operation of the method of this invention. As used herein, "oxidizing flame" means a flame produced by burning a fuel in the presence of more than the stoichiometric amount of air or oxygen.

In the following examples, a web was co-calendered with polymer immediately downstream from the extruder as shown in FIG. 1.

The flame impinging upon the molten polymer surface was generated by burning natural gas or propane with air under pressure to produce an oxidizing flame. The burner was a ribbon burner manufactured by the Flynn Burner Corporation of New Rochelle, N.Y.

The preferred conditions for the burner are an air-to-gas ratio of about 11.5:1, or an air-to-propane ratio of about 25:1, by volume, producing a flame temperature of from about 800° to about 1000° C. The fuel-oxidizer ratio was adjusted to provide a stoichiometric excess of oxygen in the flame.

Those skilled in the art will recognize that air, fuel and burner characteristics, including the number of burner heads, can be varied for optimum treatment of the polymer, depending upon the character of polymer to be treated, including, without limitation, the rate and guage of extrusion, and chemical composition of the polymer. Typical rates are from about 30 to about 100 cm per minute of final composite having a polymer layer of about 0.0025 mm thickness. The rate of extrusion is necessarily sufficient to present a continually fresh polymer surface to the treating flame, without permitting the flame to impinge on the surface long enough to cause degradation. Thus, as the rate of extrusion increases, flame volume or temperature, or both, can be increased to maintain uniform and effective treatment of the polymer surface.

EXAMPLE I

In order to determine the effectiveness of the method of the present invention, composite materials were prepared with and without flame treatment as described hereinabove. Halar ® ECTFE copolymer as described hereinabove was extruded from a 3.8-cm Davis Standard extruder at a 20:1 L/D ratio through a 30-cm die. The barrel temperature of the die in three progressive zones was 230°, 265° and 270° C.; all temperatures given in this discussion were maintained at about ±2° C. The die temperature was maintained at 270° C. The control sample was extruded without flame treatment; the test specimen was treated with an oxidizing flame within 5 cm of the exit port of the die. The molten polymer was co-calendered with woven glass-fiber fabric made from E-type glass, having an average density of 0.108 g/cm$^2$. The polymer and glass were co-calendered on a three-roll stack with the upper and lower rolls held at 120° C. and the middle roll at 175° C. The composite was then passed through the nip of take-up rolls and stored for testing.

The resultant materials were tested by measuring the peel strength necessary to separate the web from the polymer layer at the top of a 2.54-cm-wide strip. One layer of the composite strip was held stationary while the other was affixed to a scale, and the two layers subjected to a steadily increasing load until separation occurred. The composite material without flame treatment had a peel strength of 1,430 g force per cm. of width of sample to separate the polymer from the glass fabric; the flame-treated material showed a peel strength of 4,460 g/cm, or about three times the peel strength of the untreated sample.

EXAMPLE II

In another determination, composite materials were prepared with and without flame treatment as described hereinabove. Halar ® ECTFE copolymer as described hereinabove was extruded from a 9.0-cm Prodex extruder at a 30:1 L/D ratio through a 61-cm die. The barrel temperature of the die in five progressive zones was 225°, 260°, 265°, 270° and 270° C. The die temperature was maintained in three zones at 270°, 265° and 270° C., with an adapter held at 270° C. The control sample was extruded without flame treatment; the test specimen was treated with an oxidizing flame from a 50-cm Flynn burner within 5 cm of the exit port of the die. The molten polymer was extruded onto woven glass-fiber fabric made from E-type glass, having an average density of 0.108 g/cm$^2$. The polymer and fabric were co-calendered on a three-roll stack with the upper roll held at 162° C., the middle and lower rolls being maintained at a temperature of 180° C. The composite was then passed through the nip of take-up rolls and stored for testing. The rate of production of the material was about 100 kg per hour at a line speed of about 2 m per minute (min.).

In order to confirm peel-strength values obtained as described hereinabove, strips obtained as recited in Example II were tested on an Instron stress-testing machine using 2.54-cm strips pulled at the rate of 5.08 cm/min. Ten samples of the control gave an average test result of about 1400 g until failure. Ten samples of the flame-treated material gave values from about 8000 to about 9000 g. In some cases, the polymer was inseparable from the fabric before the fibrous web failed.

On the basis of results obtained in Examples II, peel values for production composites prepared in accordance with the method of the present invention would be expected to be of the order of from about 7000 to about 9000 g.

EXAMPLE III

In a third determination, Halar ® ECTFE copolymer as described hereinabove was extruded from an 11-cm Davis Standard extruder at a 24:1 L/D ratio through a 132-cm die made by Extrusion Dies, Inc. The barrel temperature of the die in five progressive zones was 290°, 280°, 275°, 275° and 270° C. The die temperature was maintained in five zones at 275°, 275°, 270°, 275°and 275° C., with an adapter being held at 270° C. The control sample was extruded without flame treatment; the test specimen was treated with an oxidizing flame from a 120-cm Flynn burner within 5 cm of the exit port of the die. The molten polymer was extruded onto woven glass-fiber fabric made from E-type glass, having an average density of 0.108 g/cm$^2$. The polymer and glass were co-calendered on a three-roll stack with the upper roll held at 115° C., the middle roll at 118°, and the lower roll at 120° C. The composite was then passed through the nip of take-up rolls and stored for testing. The rate of production of the material was about 340 kg per hour at a line speed of about 2.1 m/min.

On determining the bond strength of the material produced as set forth hereinabove, the peel value for the untreated polymer was about 1400 g/cm; that of the flame-treated material was 5000 g/cm.

Based on the results of the foregoing determinations, it is seen that flame treatment of a polymer immediately before calendering it with a web substrate increases the peel strength of the composite article by a factor of three or more.

With reference to the examples recited herein, it is seen that articles with improved adhesion between the polymer and the web can be prepared by the foregoing method.

Further, flame-treating the web prior to the step of co-calendering the materials promotes adhesion. The application of the flame to the web is necessarily subject to the same considerations as that of the application of the flame to the polymer. The mass of the web passing a given line must be considered, along with the composition of the web and the nature of the flame. Thus, for instance, a web formed of woven graphite would require a flame of a different temperature from that used in treating a web made from glass roving, which in turn would differ in characteristics from a flame directed onto a web woven of aluminum and boron fibers.

While not wishing to be bound by the following discussion, it is speculated that the mechanism giving rise to the improved peel strengths described in the examples is that of improved adhesion resulting from both superheating and oxidation at the polymer surface.

The extrudate coming from the extruder, combined with the web with which the polymer is co-calendered, have a greater guage than the distance between the calender rolls. It is theorized that a bank of surface-oxidized material forms at the nip of the roll gap, and assures uniform coating of the treated material across the width of the polymer surface, resulting in a uniform and strong bond. The molten nature of the polymer immediately at and beneath the oxidized surface enhances the mobility of the molecules at the surface, and increases the adhesive-enhancing properties from the flame treatment.

While exemplary embodiments of the invention have been described, the true scope of the invention is to be determined from the following claims:

What is claimed is:

1. The method of flame-treating molten polymer for improved adhesion to a web, comprising the steps of (a) extruding at least one polymer selected from the group consisting of ethylene/chlorotrifluoroethylene copolymer, ethylene/tetrafluoroethylene copolymer, polyvinylidene fluoride, copolyhexafluoroisopropylene-tetrafluoroethylene, vinylidene fluoride-tetrafluoroethylene copolymer, and polychlorotrifluoroethylene, (b) treating the surface of the extruded polymer with a flame, and (c) co-calendering the flame treated polymer with at least one web.

2. The method as recited in claim 1 wherein the flame is an oxidizing flame.

3. The method as recited in claim 1 wherein the web consists essentially of glass fibers.

4. The method as recited in claim 1 wherein the web consists essentially of chopped glass fibers.

5. The method as recited in claim 1 wherein two polymers are co-calendered with a web.

6. The method of claim 1 wherein said web is flame-treated.

7. The method of claim 1 wherein both the polymer and the web are flame-treated.

8. An article of manufacture comprising a composite material produced by the steps of (a) extruding at least one polymer selected from the group consisting of ethylene/chlorotrifluoroethylene copolymer, ethylene/tetrafluoroethylene copolymer, polyvinylidene fluoride, copolyhexafluoroisopropylene - tetrafluoroethylene, vinylidene fluoride-tetrafluoroethylene copolymer, and polychlorotrifluoroethylene, (b) treating the surface of the extruded polymer with a flame, and (c) co-calendering the flame-treated polymer with at least one web.

9. The article as recited in claim 8 comprising two polymers co-calendered with a web.

10. The article as recited in claim 8 wherein the web is composed of glass fibers.

11. The article as recited in claim 8 wherein the web is a woven glass fabric.

12. The article of claim 8 wherein the web is flame-treated.

13. The article of claim 8 wherein both the polymer and the web are flame-treated.

* * * * *